United States Patent [19]

Meyers

[11] Patent Number: 5,366,034
[45] Date of Patent: Nov. 22, 1994

[54] IMPACT ENERGY DISSIPATION VEHICLE

[76] Inventor: William L. Meyers, 9726 N. 300 E., Syracuse, Ind. 46567

[21] Appl. No.: 27,368

[22] Filed: Mar. 8, 1993

Related U.S. Application Data

[63] Continuation-in-part of Ser. No. 709,508, Jun. 3, 1991, abandoned.

[51] Int. Cl.[5] .............................................. B62D 63/02
[52] U.S. Cl. .......................................... 180/21; 180/10; 280/206
[58] Field of Search ................. 244/2; 180/10, 12, 21; 280/206, 207, 208

[56] References Cited

U.S. PATENT DOCUMENTS

| | | |
|---|---|---|
| 2,372,043 | 3/1945 | Aghnides . |
| 2,619,301 | 11/1952 | Hall .................................... 244/2 |
| 2,909,145 | 10/1959 | Hertelendy .................... 280/208 X |
| 3,357,736 | 12/1967 | McCarthy . |
| 3,371,886 | 3/1968 | Schertz .................................. 244/2 |
| 3,508,783 | 4/1970 | Schlanger . |
| 3,589,466 | 6/1971 | Dudley . |
| 3,695,629 | 10/1972 | Schlanger . |
| 3,718,342 | 2/1973 | Freed ........................... 280/208 X |
| 3,743,347 | 7/1973 | Shaw . |
| 3,806,184 | 4/1974 | Dean . |
| 3,831,998 | 8/1974 | Hewitt . |
| 3,837,422 | 9/1974 | Schlanger . |
| 3,876,025 | 4/1975 | Green ................................. 180/21 |
| 3,893,707 | 7/1975 | Samsel ............................. 280/208 |
| 4,165,846 | 8/1979 | Groeger ............................... 244/2 |
| 4,386,787 | 6/1983 | Maplethorpe et al. . |
| 4,505,346 | 3/1985 | Mueller ......................... 280/206 X |
| 4,729,446 | 3/1988 | Sefton ........................... 280/206 X |
| 4,881,701 | 11/1989 | Bullard ............................ 244/2 X |

FOREIGN PATENT DOCUMENTS 484116  8/1973  U.S.S.R. ............................. 280/206

Primary Examiner—Margaret A. Focarino
Assistant Examiner—Carla Mattix
Attorney, Agent, or Firm—Barnes & Thornburg

[57] ABSTRACT

A vehicle has a passenger compartment suspended between two wheels mounted at the ends of a single axle that is perpendicular to the direction of travel. The passenger compartment is mounted beneath the axle so as to allow the passenger compartment to repeatedly rotate in an unconstrained manner about the axle upon impact of the vehicle with another object so as to convert linear momentum of the vehicle into self-extinguishing angular momentum in order to dissipate energy and reduce injury to passengers in the passenger compartment.

14 Claims, 4 Drawing Sheets

IMPACT ENERGY DISSIPATION VEHICLE

This application is a continuation-in-part of U.S. application Ser. No. 07/709,508, now abandoned, filed Jun. 3, 1991, for an "Impact Energy Conversion Vehicle."

BACKGROUND AND SUMMARY OF THE INVENTION

The present invention relates to vehicles in which people may be transported in a passenger compartment, and more particularly to automotive vehicles by which the passengers of the vehicle control the vehicle in both full size for adults and reduced size for children.

Automotive vehicles powered by self-contained engines have been provided since the early part of this century. With the number of automotive vehicles on the road increasing, concern for safety of the passengers also has been increasing. Critics are not satisfied with the safety of these vehicles, although various safety features have been provided to automotive vehicles. Protection of the passenger compartment upon impact has primarily been provided by reinforcing the passenger compartment and/or allowing the passenger compartment to collapse upon impact in an engineered manner by which the passengers are protected. A few designs have been provided by which the passenger compartment separates upon impact and travels upon an inclined plane to absorb impact, Others utilize spherical or cylindrical passenger compartments, and others use seats which pivot with regard to the frame of the vehicle. None of these latter designs have been commercialized or placed into production.

It is therefore highly desirable to provide a new and improved automotive vehicle.

It is also highly desirable to provide an improved automotive vehicle which has improved capability of absorbing the impact of collision from all directions.

It is also highly desirable to provide an improved automotive vehicle in which the passenger compartment is mounted with respect to the axle such that the linear forces of collision are converted to angular movement thereby absorbing the impact of collision.

It is also highly desirable to provide an improved automotive vehicle in which the passenger compartment is allowed to move through 360° of rotation, unconstrained upon collision with another object.

It is also highly desirable to provide an improved automotive vehicle in which wheels are mounted on an axle and the passenger compartment is mounted beneath the axle between the wheels and allowed to swing about the axle in unconstrained, 360° rotational movement upon collision with another object.

It is also highly desirable to provide an improved automotive vehicle in which the impact of collision is absorbed by converting the force of impact in one direction to angular momentum and allowing the passenger compartment to swing unconstrained, 360° about the axle and by providing wheels spanning the entire passenger compartment which collapse upon impact in the other direction.

It is finally highly desirable to provide an improved automotive vehicle having all of the above-identified features.

It is therefore an object of the invention to provide a new and improved automotive vehicle.

It is also an object of the invention to provide an improved automotive vehicle which has improved capability of absorbing the impact of collision from all directions.

It is also an object of the invention to provide an improved automotive vehicle in which the passenger compartment is mounted with respect to the axle such that the linear forces of collision are converted to angular movement thereby absorbing the impact of collision.

It is also an object of the invention to provide an improved automotive vehicle in which the passenger compartment is allowed to move through 360° of rotation, unconstrained upon collision with another object.

It is also an object of the invention to provide an improved automotive vehicle in which wheels are mounted on an axle and the passenger compartment is mounted beneath the axle between the wheels and allowed to swing about the axle in unconstrained, 360° rotational movement upon collision with another object.

It is also an object of the invention to provide an improved automotive vehicle in which the impact of collision is absorbed by converting the force of impact in one direction to angular momentum and allowing the passenger compartment to swing unconstrained, 360° about the axle and by providing wheels spanning the entire passenger compartment which collapse upon impact in the other direction.

It is finally an object of the invention to provide an improved automotive vehicle having all of the above-identified features.

In the broader aspects of the invention, there is provided a new and novel automotive vehicle having a passenger compartment suspended between two wheels mounted at the ends of a single axle that is perpendicular to the direction of travel. The passenger compartment is mounted beneath the axle so as to allow the passenger compartment to pivot in an unconstrained manner, 360° about the axle upon collision. In one particular embodiment of the invention, the two wheels are fixed hubs that have one or more drive wheels attached thereto. In another particular embodiment of the invention, the two wheels are fixed hubs that have endless drive tracks mounted thereon.

BRIEF DESCRIPTION OF THE DRAWINGS

The above-mentioned and other features of the objects of the invention and the manner of attaining them will become more apparent and the invention will be better understood by reference to the following description of embodiments of the invention taken in conjunction with the accompanying drawings wherein.

DETAILED DESCRIPTION OF THE DRAWINGS

Figure 1:
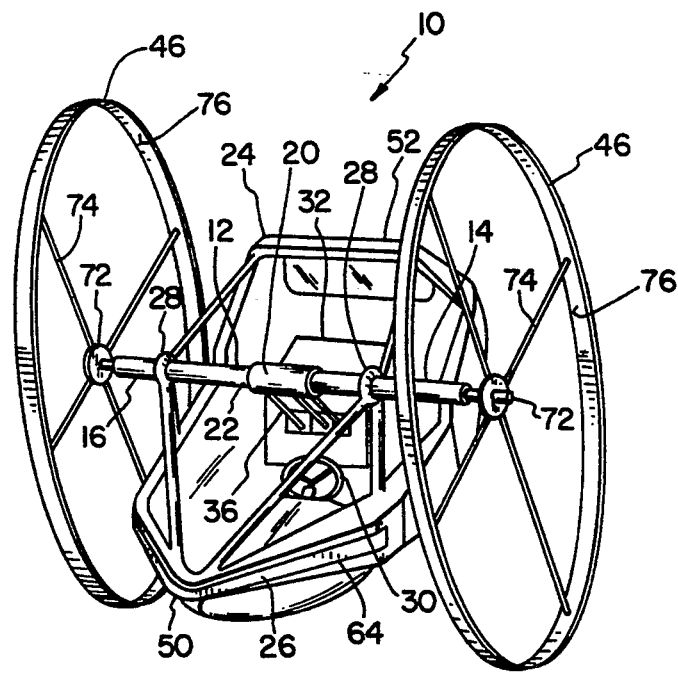
FIG. 1 is a perspective view of the new and improved automotive vehicle of the invention.
Figure 2:
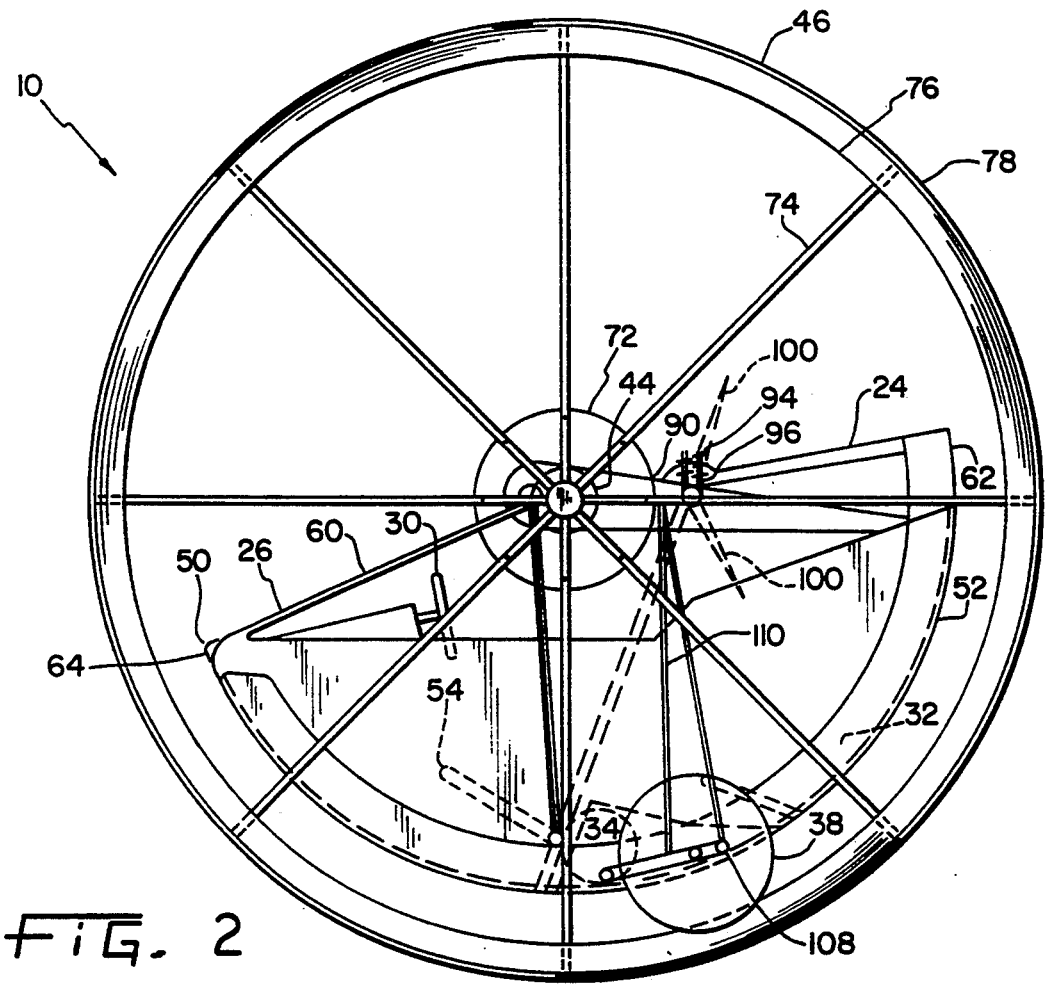
FIG. 2 is a side elevational view of the new and improved automotive vehicle of the invention having motor driven wheels, a passenger compartment, suspension, and a wing and tab attitude control.

Referring to FIGS. 1 and 2, there is shown the improved vehicle 10 of the invention. An axle housing 12 is provided with both port 14 and starboard 16 axles. Each is provided with a pair of pulleys 20 at their proximal ends 22. Hung from the axle housing 12 is a passenger compartment 24. In a specific embodiment, passenger compartment 24 comprises a frame 26 which has overhead bearings 28 which encircle axle housing 12 and allow the passenger compartment 24 to move in a relatively unconstrained fashion 360° about the axle housing 12. Passenger compartment 24, in all embodiments, has a center of gravity below axle 12. Passenger compartment 24 has therein passenger seats 54 (see FIGS. 2 and 3), a steering wheel 30 and a motor box 32 rearward of the front passenger seats 54. Contained within the motor box 32 is a motor/transmission 34 (see FIGS. 2 and 5) for driving the vehicle of the invention. In a specific embodiment, motor/transmission 34 can be an internal combustion engine, electric motor, steam turbine or other conventional motor. Motor/transmission 34 is connected to pulleys 20 by a plurality of drive belts 36. In a specific embodiment, there are two pair of drive belts, two port and two starboard, for duplicated reserve if a drive belt 36 should break.

Steering wheel 30 controls drive wheels 38 (shown in FIGS. 2 and 5) which are connected to motor/transmission 34 as mentioned hereinafter and deliver power to right or left idler pulleys to turn or drive the vehicle 10. Disk brakes 44 (shown in FIG. 2) are provided adjacent each wheel 46 at the distal ends of both port 14 and starboard 16 axles.

Figure 3:
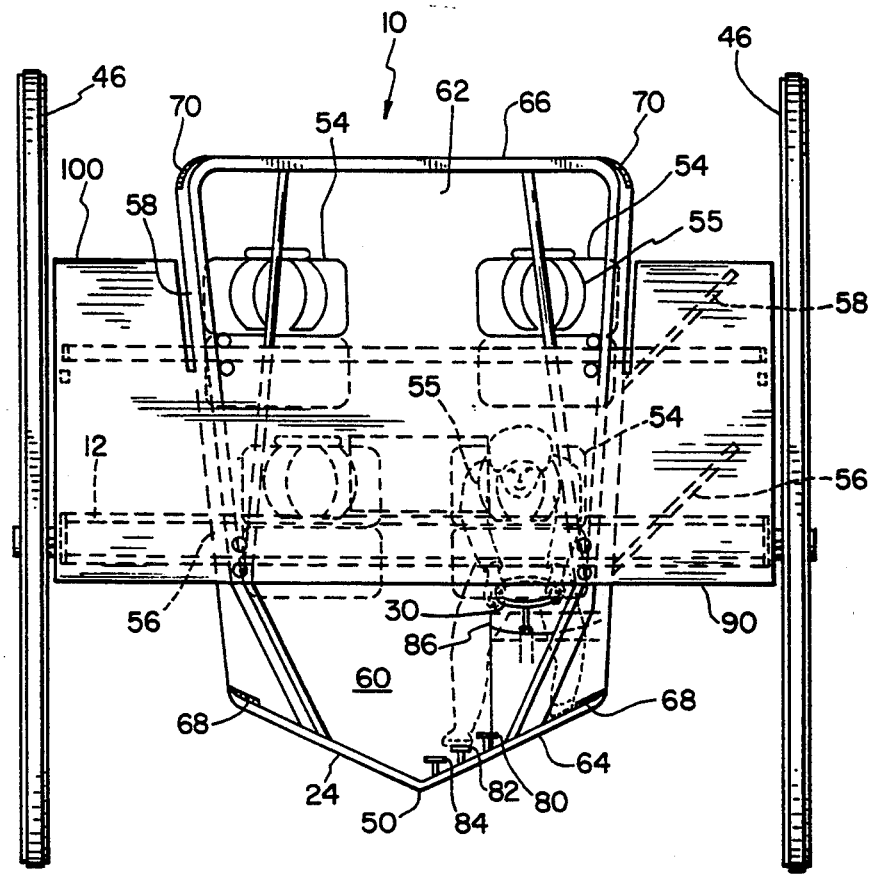
FIG. 3 is a top view of the automotive vehicle shown in FIG. 2.
Figure 6:
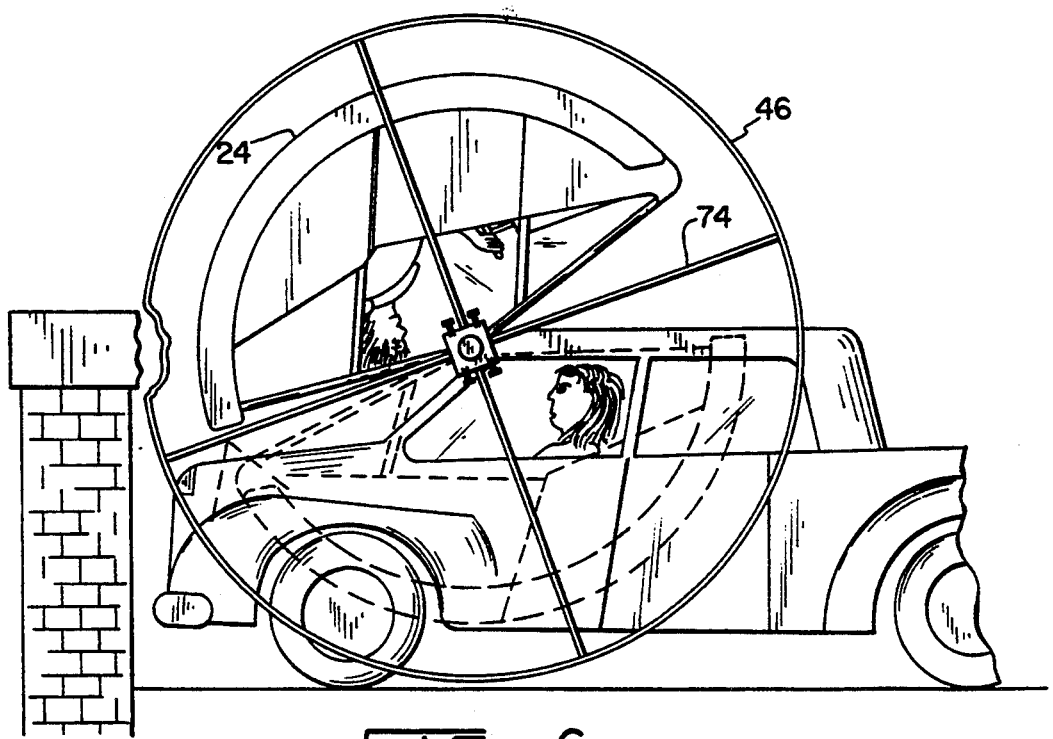
FIG. 6 is a side elevational view of the automotive vehicle of the invention illustrating the energy dissipating features of the vehicle.

The size relationship of the passenger compartment 24 and the wheels 46 is best shown in FIGS. 2 and 6. The passenger compartment 24 has a front 50 and a rear 52, and in a specific embodiment four passenger seats 54 therein (see also FIG. 3). Referring to FIG. 3, passenger restraints 55 are provided for each seat 54. Access to the passenger compartment 24 is by opposite front doors 56 and/or rear doors 58. The passenger compartment 24 is provided with a windshield 60 and a rear window 62. In a specific embodiment, the passenger compartment 24 has a front bumper 64, rear bumper 66, headlights 68, and back-up and parking lights 70. Referring again to FIG. 2, wheels 46 include a hub 72, spokes 74 and tread support 76. Tread 78, in a specific embodiment, is a precured rubber tread as is conventional. In a specific embodiment, hub 72 may be a transparent polycarbonate hub, and spokes 74 and tread support 76 may be fabricated of steel. In a specific embodiment, the automotive vehicle 10 of the invention includes an accelerator 80, a brake 82, a clutch 84 and a gear shift 86 (see FIG. 3).

Figure 4:
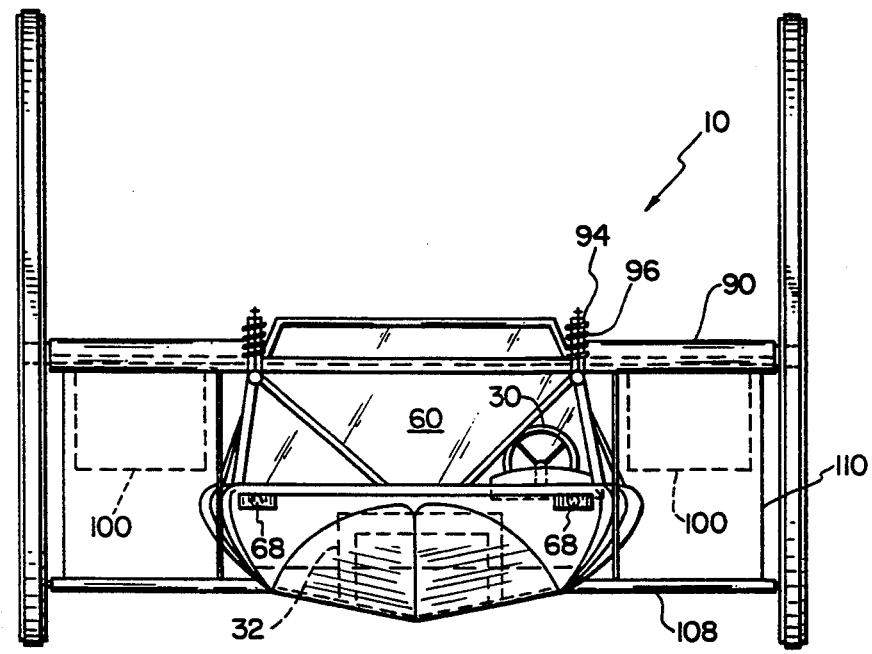
FIG. 4 is a front view of the automotive vehicle shown in FIG. 2 showing the passenger compartment, suspension, and the wing and tab attitude control.
Figure 5:
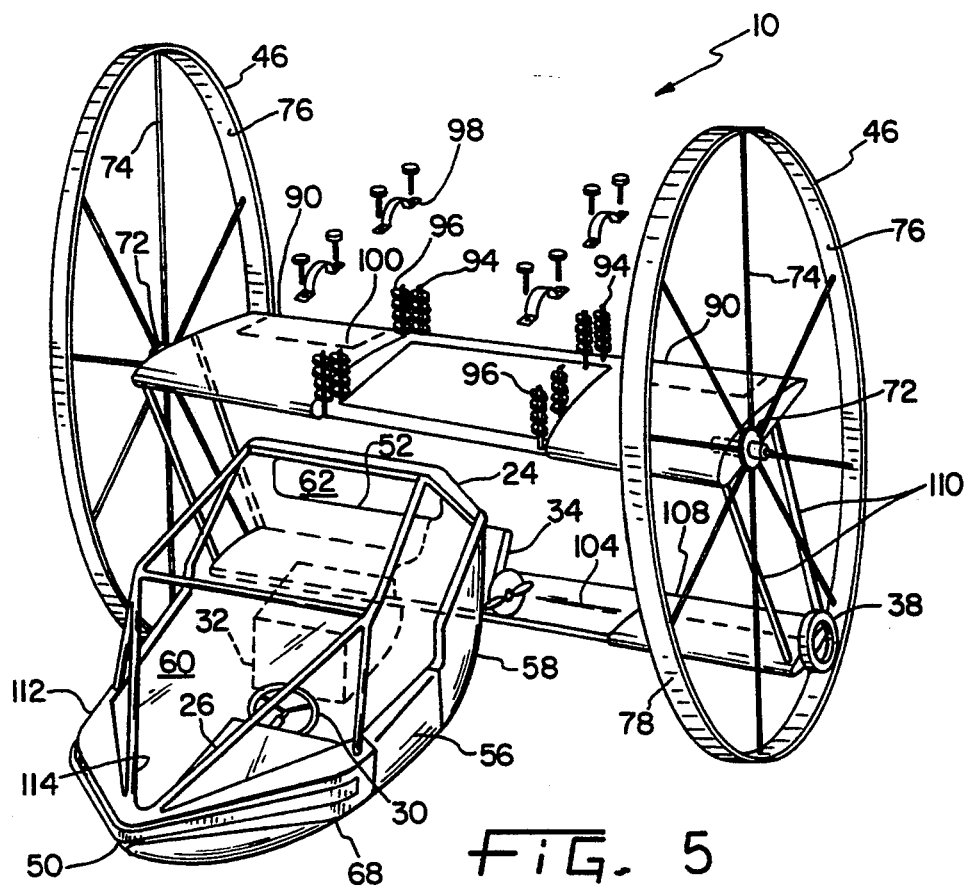
FIG. 5 is a perspective and partially exploded view of the automotive vehicle of the invention, complete without the excluded structure of FIG. 1.

An axle wing 90 is provided on which the passenger compartment 24 is attached. See FIGS. 2 through 5. Axle housing 12 extends through axle wing 90 such that axle wing 90 may move uninhibited, 360° around axle housing 12. Passenger compartment 24 is attached to the axle wing 90 by means of eight compression springs 94 and shock absorbers 96 as shown in FIGS. 4 and 5. In a specific embodiment, the shock absorbers 96 are mounted within the compression springs 94 and are connected between the passenger compartment 24 and the axle wing 90. The springs are compressed between their attachment by means of the brackets 98. By this means, passenger compartment 24 floats on the resiliency of the springs 94 and its oscillations are dampened by the shock absorbers 96.

Axle wing 90 is provided with trim tabs 100 (see FIGS. 2, 3, and 5). Trim tabs 100 are operatively connected to the steering wheel 30 by cables (not shown) such that trim tabs 100 may be moved in their expanded position as shown in FIG. 2 from its at rest position as shown in FIGS. 4 and 5 by telescoping movements of the steering wheel 30. By adjustment of the trim tabs 100, trim tabs 100 and axle wing 90 act against the wind created by higher speeds or ambient winds to fix the attitude of the passenger compartment 24.

As shown in FIGS. 2 and 5, the automotive vehicle 10 of the invention is provided with motor driven wheels 38 which ride on steel tread support 76 and are driven through a shaft 104 extending from motor/transmission 34. In all embodiments of the invention, wheels 46 are larger in diameter than the maximum dimension of the passenger compartment 24 in the same direction. Therefore, wheels 46 are always fore-and-aft of the passenger compartment 24. In a specific embodiment, the diameter of each wheel 46 is greater than twice the height of the hood of a conventional automobile. In a specific embodiment, wheels 46 have a diameter of about eight feet.

In a specific embodiment, the drive wheels 38 are tired so as to frictionally engage the tread support 76. In another specific embodiment not shown, the drive wheels 38 and tread support 76 are geared such that the teeth of the drive wheels 38 mesh with the teeth of the tread support 76.

Surrounding the shaft 104 is lower wing 108 (shown in FIGS. 2, 4, and 5). Wing 108 does not have trim tabs 100. Axle wing 90 and wing 108 are interconnected by cables or struts 110 such that they function together at all times.

Passenger compartment 24 has a frame 112 of a plurality of struts 114 welded together as best shown in FIG. 5. In a specific embodiment, passenger compartment 24 may have a collapsible frame while in itself will absorb impact upon collapsing as designed.

Air bags, seat belts, shatterproof glass, impact absorbing bumpers, padded interior and other safety devices are contemplated to be used with the motor vehicle 10 of the invention, but are not a part of the invention.

In use, the improved motor vehicle 10 of the invention suspends the passenger compartment 24 under the axle housing 12 instead of upon the axle housing 12 as is conventional. Placing the passenger compartment 24 under the axle housing 12 provides physical protection to the occupants and allows the passenger compartment 24 to dissipate energy during a collision.

The passenger compartment 24 of the automotive vehicle 10 of the invention is hung or suspended between two wheels 46 at the opposite ends of a single axle housing 12 extending perpendicular to the direction of travel allowing the passenger compartment 24 to freely rotate 360° in the event of a collision. By this means, potentially lethal energy of a collision is dissipated so as to be of little threat to the safety of the occupants of the passenger compartment 24.

When passenger compartment 24 is provided with wings 90 and 108, the axle wing 90 also functions as a protective barrier for the passengers within the passenger compartment 24 during head-on or rear end collision. The shape of wings 90 and 108 is of secondary importance, as the wings 90 and 108 are aimed at stabilizing the passenger compartment 24 against wind resistance encountered at higher speeds. The wing 90, being the strongest member of the power frame, is placed between the passenger compartment 24 and its occupants. (See FIGS. 3–5).

The passenger compartment 24 offers no immediate resistance to impact until after rotating through at least a 90° arc when it is on the other side of the axle housing 12 from the impacting vehicle. Furthermore, as the wheels 46 of the automotive vehicle 10 of the invention are larger than the passenger compartment 24 in all embodiments, the passengers within the passenger compartment 24 are protected even when a collision occurs from the side. Such an impact may cause acceleration as well as deceleration, however, with only two wheels 46 in contact, the automotive vehicle 10 of the invention can be expected to take an angular direction to the original path of movement and the passenger compartment 24 will still rotate even if overturned on its side. In any of these examples, the force component of any impact directed transverse to the axle housing 12 will cause angular motion of the passenger compartment 24 about axle housing 12, thereby decreasing the possibility of serious injury and fatality to the occupants of the passenger compartment 24.

Even if struck directly from the side with force enough to collapse the wings 90 and 108, so that the passenger compartment 24 cannot rotate, the maximum impacting height of a conventional automobile's hood is less than the hub 72 of the wheel 46, in a specific embodiment, and the collapsing wheel 46 will serve as an inclined plane to lift the passenger compartment 24 and its occupants out of the path of collision. Because the wheels 46 are larger in diameter than the passenger compartment 24, they are always fore-and-aft of the passenger compartment 24. Therefore, wheels 46 are automatically protective of the passengers within the passenger compartment 24 in the event of a collision with an abutment or insurmountable wall. (See FIG. 6).

The motor/transmission 34 within motor box 32 powers the vehicle 10 of the invention by the double drive belts 36 and/or the drive wheels 38. These belted pulleys and drive wheels turn the two wheels 46. In a specific embodiment, not illustrated, electric, hydraulic or air driven motors are mounted to the wheels 46 themselves at the opposite ends of the axle housing 12 and the wheels 46 are geared directly to such motors.

With the motor/transmission 34 mounted outside of the passenger compartment 24 in the motor box 32, the motor/transmission 34 will not penetrate the passenger compartment 24 in the event of a collision as commonly occurs in conventional motor vehicle because of the centrifugal force imparted to the motor/transmission 34 by the angular rotation of the passenger compartment 24.

The telescoping steering wheel 30 provides control of the trim tabs 100. The trim tabs 100 can be moved into an expanded position from an at rest position by telescopically moving the steering wheel 30 to control the attitude of the passenger compartment 24 during movement.

Referring to FIG. 6, the dissipation of impact energy through self-extinguishing angular momentum is shown. Upon impact, the passenger compartment 24 of the automotive vehicle 10 of the invention is rotated at least 90° and positioned with the axle housing 12 and wing 90 between the impacting vehicle and the passenger compartment 24. The wheels 46 absorb the impact with large immovable objects in all directions.

The improved automotive vehicle 10 of the invention provides an automotive vehicle with an improved capability of absorbing collision impact from all directions by allowing the passenger compartment to rotate and the wheels to collapse upon impact.

Figure 7:
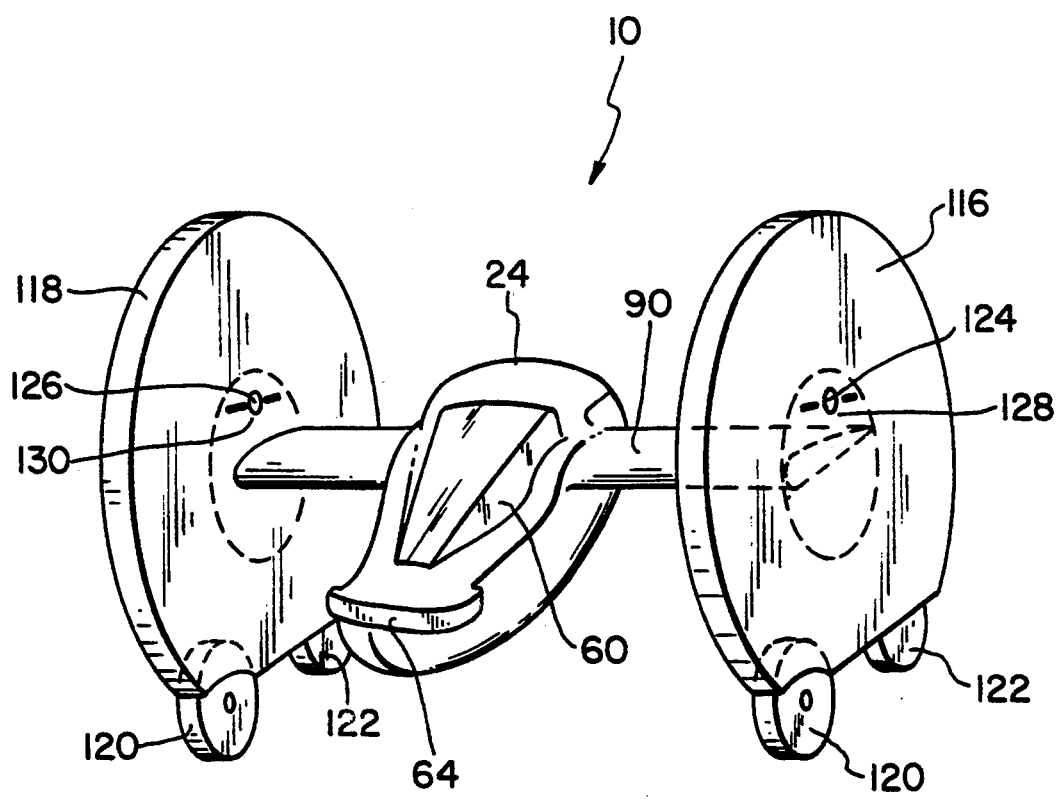
FIG. 7 is a perspective view of another embodiment of the present invention.

FIG. 7 shows another embodiment of the present invention. Vehicle 10 is shown with passenger compartment 24 having windshield 60 and front bumper 64. Axle wing 90 is also shown extending between opposite portions of passenger compartment 24 and hubs 116 and 118. Wing 90 is attached to portions of passenger compartment 24 and hubs 116 and 118. Wing 90 may have a pair of trim tabs (not shown) that are movable through a range extending from an at rest position to an expanded position. The trim tabs allow for selective rotation and adjustment of the attitude of passenger compartment 24 during movement of vehicle 10.

As shown in FIG. 7, hubs 116 and 118 extend beyond passenger compartment 24 in all directions. Because hubs 116 and 118 are always fore-and-aft of passenger compartment 24, they are protective of passengers within in the event of a collision. Hubs 116 and 118 are also designed to collapse when a predetermined force is exerted on them resulting from an oblique collision. In the event of such an oblique collision, hubs 116 and 118 can both form inclined planes that lift passenger compartment 24 away from an impacting object.

FIG. 7 also shows a pair of drive wheels 120 and 122 attached to hubs 116 and 118. Wheels 120 and 122 both drive and support vehicle 10 relative to an underlying surface. While two drive wheels 120 and 122 are shown, it is to be understood that the use of more than two drive wheels is still within the scope and spirit of the present invention.

Passenger compartment 24 is suspended between hubs 116 and 118 and below wing 90 that surrounds an axle (not shown) which is connected to and extends between passenger compartment 24 and hubs 116 and 118. With this particular mounting configuration, passenger compartment 24 is capable of fully and repeatedly rotating about the axle (not shown) in an unconstrained manner upon impact of vehicle 10 with another object. This rotation is intended to convert the linear momentum of vehicle 10 into self-extinguishing angular momentum in order to dissipate energy and reduce injury to occupants of passenger compartment 24. Passenger compartment 24 is prevented from rotating during normal operation of vehicle 10 by adjustable shear pins 124 and 126 attached respectively to portions 128 and 130 of hubs 116 and 118 so as to adjust the attitude of passenger compartment 24 whether in motion or stationary. A predetermined impact force is necessary before shear pins 124 and 126 will break and allow passenger compartment 24 to rotate.

While specific embodiments of the invention have been shown and described herein for purposes of illustration, the protection afforded by any patent which may issue upon this application is not strictly limited to the disclosed embodiments; but rather extends to all structures and arrangements (e.g., a toy vehicle that children can ride in) which fall fairly within the scope of the claims which are appended hereto:

What is claimed is:

1. An automotive vehicle having a passenger compartment, an axle having opposite ends, a pair of wheels mounted at said opposite ends of said axle, said passenger compartment being suspended between said wheels and beneath and from said axle so as to be able to move in an unrestrained fashion about said axle upon impact, said axle being generally perpendicular to the direction of travel, said wheels being larger in diameter than said passenger compartment, a power source connected to said passenger compartment and including a drive shaft extending therefrom, a belt drive on said power source driving both said axle and said drive shaft, drive wheels on said drive shaft engaging each of said wheels, a first wing mounted on the axle, and a second wing positioned about said drive shaft, wherein said first wing and said second wing are operatively connected together.

2. An automotive vehicle having a passenger compartment, an axle having opposite ends, a pair of wheels mounted at said opposite ends of said axle, said passenger compartment being suspended between said wheels and beneath and from said axle so as to be able to move in an unrestrained fashion about said axle upon impact, said axle being generally perpendicular to the direction of travel, said wheels being larger in diameter than said passenger compartment, a power source connected to said passenger compartment and including a drive shaft extending therefrom, a belt drive on said power source driving both said axle and said drive shaft, drive wheels on said drive shaft engaging each of said wheels, a first wing mounted on the axle, wherein a second wing is positioned about said drive shaft, wherein said first wing and said second wing are operatively connected together, and wherein said passenger compartment is positioned between said first wing and said second wing.

3. An automotive vehicle having a passenger compartment, an axle having opposite ends, a pair of drive wheels mounted at said opposite ends of said axle for driving and supporting the vehicle relative to an underlying surface, said passenger compartment being suspended between said wheels and beneath and from said axle so as to be able to rotate about the axle in an unrestrained manner so as to convert linear momentum of the vehicle into self-extinguishing angular momentum upon collision of the vehicle with another object so as to dissipate energy and reduce injury to passengers in said vehicle, said axle being generally perpendicular to the direction of travel, said drive wheels being larger in diameter than said passenger compartment so as to allow the compartment to move about the axle upon impact of the wheels with another object, wherein said wheels serve as bumpers for said passenger compartment, said wheels being fore-and-aft and to the side of said passenger compartment at all positions therebetween, and said wheels being collapsible upon collision to form an inclined plane lifting said passenger compartment away from the impacting object.

4. An automotive vehicle having a passenger compartment, an axle having opposite ends, a pair of drive wheels mounted at said opposite ends of said axle for driving and supporting the vehicle relative to an underlying surface, said passenger compartment being suspended between said wheels and beneath and from said axle so as to be able to rotate about the axle in an unrestrained manner so as to convert linear momentum of the vehicle into self-extinguishing angular momentum upon collision of the vehicle with another object so as to dissipate energy and reduce injury to passengers in said vehicle, said axle being generally perpendicular to the direction of travel, said drive wheels being larger in diameter than said passenger compartment so as to allow the compartment to move about the axle upon impact of the wheels with another object, wherein a power source connects to said passenger compartment and includes a drive shaft extending therefrom, wherein a belt drive on said power source drives both said axle and said drive shaft, and wherein drive wheels on said drive shaft engage each of said wheels.

5. The vehicle of claim 4, wherein a transmission and clutch are positioned between said power source and said drive wheels.

6. The vehicle of claim 4, wherein a transmission and clutch are positioned between said power source and said belt drive.

7. A vehicle comprising:
a passenger compartment;
an axle having opposing ends;
wheels mounted at said opposing ends of said axle for driving and supporting said vehicle relative to an underlying surface;
means for applying a driving force to said wheels;
means for suspending said passenger compartment between said drive wheels and below said axle so as to enable the passenger compartment to fully and repeatedly rotate about said axle in an unconstrained manner upon impact of said vehicle with another object so as to convert linear momentum of the vehicle into self-extinguishing angular momentum in order to dissipate energy and reduce injury to occupants in said passenger compartment;
wherein each of said wheels are collapsible upon oblique or orthogonal collisions of one of said wheels with another object so that said wheel forms an incline plane that lifts said passenger compartment away from said impacting object.

8. A vehicle comprising:
a passenger compartment;
an axle having opposing ends;
wheels mounted at said opposing ends of said axle for driving and supporting said vehicle relative to an underlying surface;
means for applying a driving force to said wheels;
means for suspending said passenger compartment between said drive wheels and below said axle so as to enable the passenger compartment to fully and repeatedly rotate about said axle in an unconstrained manner upon impact of said vehicle with another object so as to convert linear momentum of the vehicle into self-extinguishing angular momentum in order to dissipate energy and reduce injury to occupants in said passenger compartment;
a first wing mounted on said axle and between said wheels;
wherein said first wing has trim tabs pivotally connected to said first wing, said trim tabs being movable through a range from an at rest position to an expanded position so as to selectively rotate and adjust the attitude of said passenger compartment during motion of said vehicle; and
a second wing mounted on drive shafts extending to said drive means used for driving said wheels.

9. The vehicle of claim 8, wherein said first and second wings are connected together.

10. A vehicle comprising:
a passenger compartment;

an axle having opposing ends;

a pair of fixed hubs mounted at opposing ends of said axle;

at least one drive wheel attached to each of said hubs for driving and supporting said vehicle relative to an underlying surface; and means for suspending said passenger compartment between said hubs and below said axle so as to enable the passenger compartment to fully and repeatedly rotate about said axle in an unconstrained manner upon impact of said vehicle with another object so as to convert linear momentum of the vehicle into self-extinguishing angular momentum in order to dissipate energy and reduce injury to occupants in said passenger compartment;

wherein each of said hubs are collapsible upon oblique or orthogonal collisions of one of said hubs with another object so that said hub forms an incline plane that lifts the passenger compartment away from said impacting object.

11. A vehicle comprising:

a passenger compartment;

an axle having opposing ends;

a pair of fixed hubs mounted at opposing ends of said axle;

at least one drive wheel attached to each of said hubs for driving and supporting said vehicle relative to an underlying surface;

means for suspending said passenger compartment between said hubs and below said axle so as to enable the passenger compartment to fully and repeatedly rotate about said axle in an unconstrained manner upon impact of said vehicle with another object so as to convert linear momentum of the vehicle into self-extinguishing angular momentum in order to dissipate energy and reduce injury to occupants in said passenger compartment;

a first wing mounted on said axle and between said hubs;

wherein said first wing has trim tabs pivotally connected to said first wing, said trim tabs being movable through a range from an at rest position to an expanded position so as to selectively rotate and adjust the attitude of said passenger compartment during motion of said vehicle; and a second wing mounted on drive shafts extending to said drive wheels.

12. The vehicle of claim 11, wherein said first and second wings are connected together.

13. A vehicle comprising:

a passenger compartment;

an axle having opposing ends;

a pair of fixed hubs mounted at opposing ends of said axle;

at least one drive wheel attached to each of said hubs for driving and supporting said vehicle relative to an underlying surface; and means for suspending said passenger compartment between said hubs and below said axle so as to enable the passenger compartment to freely and non-selectably rotate fully and repeatedly about said axle in an unconstrained manner upon impact of said vehicle with another object so as to convert linear momentum of the vehicle into self-extinguishing angular momentum in order to dissipate energy and reduce injury to occupants in said passenger compartment;

wherein said suspending means includes adjustable shear pins that secure said passenger compartment from full and complete rotation about said axle during normal operation of said vehicle.

14. The vehicle of claim 13, wherein said shear pins are attached to said hubs.

* * * * *